(No Model.)
2 Sheets—Sheet 2.

T. L. RICHARDSON.
SULKY PLOW.

No. 264,763.  Patented Sept. 19, 1882.

Attest:
Geo. T. Smallwood Jr.
J. M. Hopkins

Inventor:
Thomas L. Richardson
By Knight Bros
Attys.

N. PETERS, Photo-Lithographer, Washington, D. C.

UNITED STATES PATENT OFFICE.

THOMAS L. RICHARDSON, OF INDIANAPOLIS, INDIANA.

SULKY-PLOW.

SPECIFICATION forming part of Letters Patent No. 264,763, dated September 19, 1882.

Application filed May 29, 1882. (No model.)

*To all whom it may concern:*

Be it known that I, THOMAS L. RICHARDSON, a citizen of the United States, residing at Indianapolis, in the county of Marion and State of Indiana, have invented certain new and useful Improvements in Wheel-Plows, of which the following is a specification.

My invention relates to that class of plows in which the frame is mounted upon three wheels, one wheel having bearing on a horizontal spindle, and the other two wheel-spindles, in their normal position, being inclined at an angle to the horizontal. Of these two wheels, one in the rear of the plowshare runs in the "live" furrow and the one forward of the share runs in the furrow last plowed.

My invention particularly consists in the means of adjustment provided for the spindles of the inclined wheels and the plow upon the frame, and in the method of connecting the rear wheel-spindle to the frame, so as to allow the machine to turn more readily.

The invention will be first described with reference to the accompanying drawings, and then pointed out in the claims.

Figure 1:
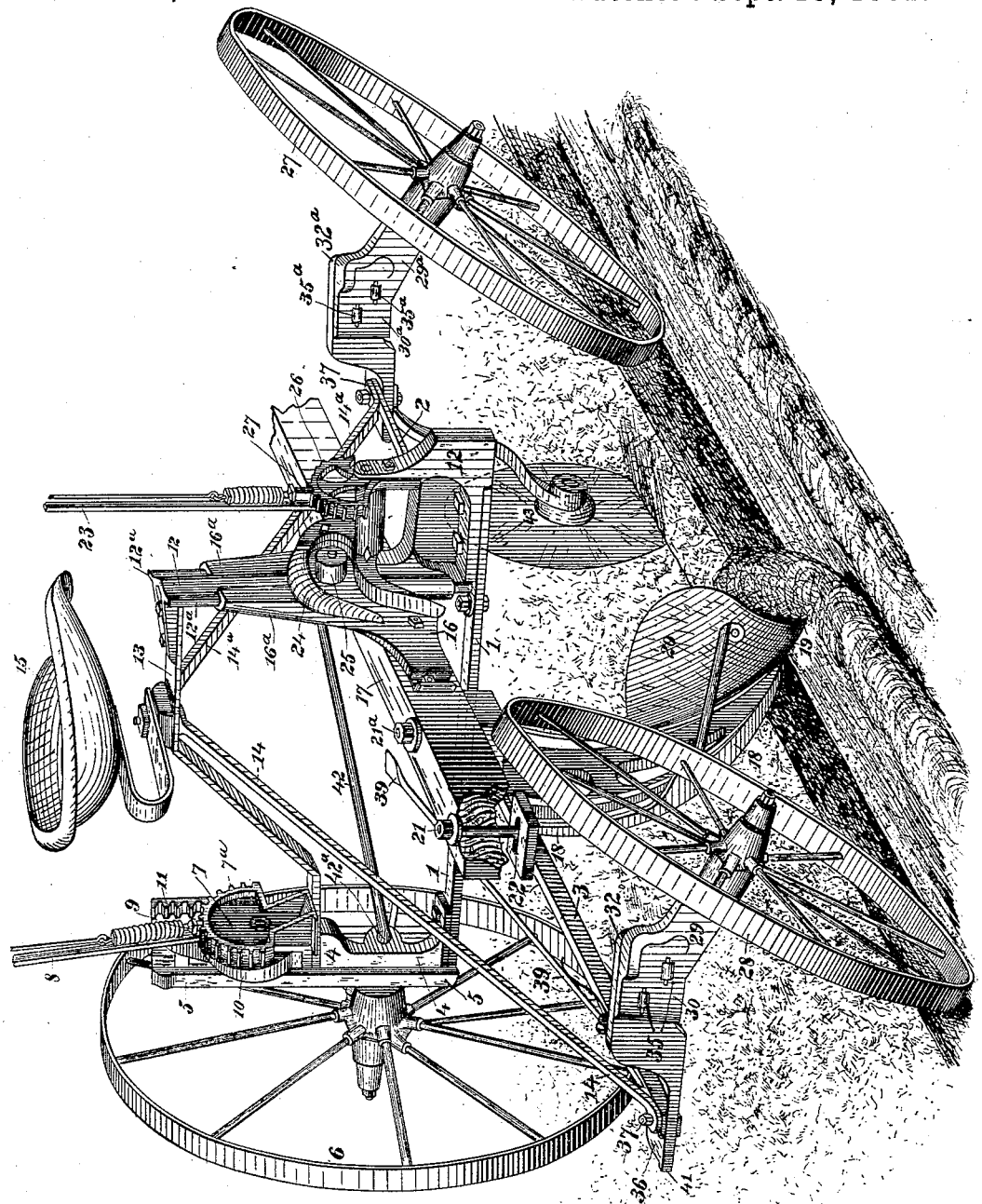
Figure 2:
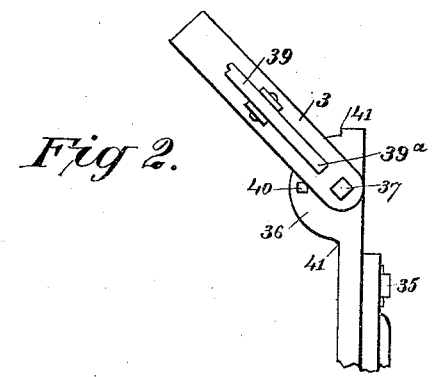
Figure 3:
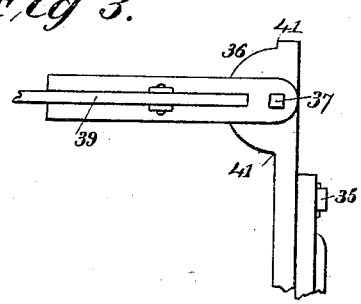
Figure 7:
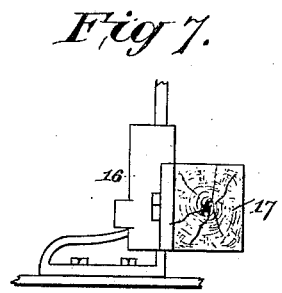
Figure 6:
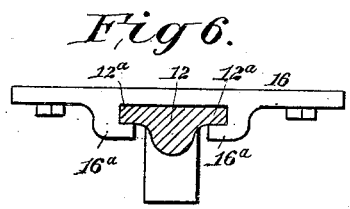
Figure 4:
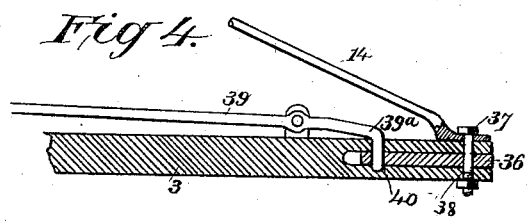
Figure 5:
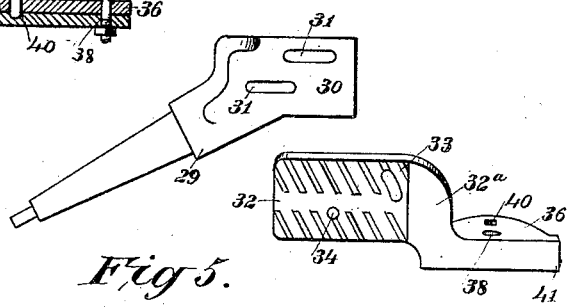

In the drawings, Figure 1 is a perspective view of the plow from the rear. Figs. 2 and 3 are plans of the joint connecting the rear wheel-spindle to the frame in two positions. Fig. 4 is a sectional view of the same. Fig. 5 is a view of the two-part spindle. Figs. 6 and 7 are respectively a section and an elevation representing the vertical standard on which the plow-beam is guided.

The main frame of the machine consists of a transverse bar, 1, and two longitudinal bars, 2 3, attached to the bar 1 on its forward and rear side, respectively.

To one end of bar 1 is secured a casting, 4, which is held within a vertical guide, 5, on the lower end of which is carried the horizontal spindle of the wheel 6. This wheel, which may, if preferred, be a caster-wheel, is held to a vertical position, as shown, and is intended to run on the "land" or unplowed portion of the field.

For the vertical adjustment of the frame on the guide 5 I have shown mechanism such as that commonly employed in plows of this class, consisting of a sector, 7, mounted on the casting 4 and having teeth $7^a$, a hand-lever, 8, carrying, first, a spring-catch, 9, for engagement with the sector-teeth, and, second, a cog, 10, whose teeth engage with the teeth of the rack 11 on the inner face of guide 5.

A brace-rod, 42, connecting the casting 4 with the forward end of the plow-beam, is so loosely held within the piece 4 as to allow free vertical movement of the plow-beam by the mechanism hereinafter described. This loose connection of the rod 42 may be effected in several ways. For example, the end of the rod may be provided with a hook, $42^a$, which may pass through a hole in the piece 4, as shown; or a stud, having an eye on its forward end, may be bolted within said hole and receive the end of rod 42.

Upon the other extremity of bar 1 is mounted a vertical standard, 12, whose upper end supports one end of a bar, 13, supported at its other end on piece 4 and braced rearward and forward by rods 14 $14^a$, bolted to the rear and front ends, respectively, of bars 2 3. Upon the cross-bar 13 is supported the driver's seat 15.

The standard 12 is provided on each side with a web or flange, $12^a$, and is embraced by the jaws $16^a$ $16^a$ of a plate, 16, which is firmly bolted to the iron or wood beam 17 of the plow. The plow-standard 18, carrying share 19 and mold-board 20, is bolted to the beam 17, as at 21 $21^a$. The standard is slotted transversely at the point 22 for the passage of the bolt 21, said slot being for the purpose of allowing horizontal adjustment of the plowshare, so as to turn its point into or out of the land. This is regulated according to the quality of soil being plowed, in soft loamy soil the point of the plow being directed into the land at a much greater angle than in hard ground. A suitable colter is shown at 43.

It will be seen that the plow employed lacks the usual landside, the slanting position of the furrow-wheel in plows of this class giving them so firm a bearing as to render the guiding influence of the landside unnecessary, and even objectionable.

The mechanism shown for raising or lowering the plow is also similar to that common in machines of this class, consisting of a hand-lever, 23, pivoted to the frame, and carrying a crow-bill, 24, between the jaws of which the roller 25 is mounted on the guide-plate 16. A toothed segment, 26, and spring-catch 27 are provided to set the hand-lever in any desired position.

In plows having only two wheels the upward bearing of the heel of the plow, when forced through the ground, renders it necessary to use a tongue and neck-yoke, by which means the whole pressure is transferred directly to the horses' necks. By the arrangement I have described of three wheels and the stiff rear and front braces, 14 14ª, serving to hold the standard 12 to an exactly vertical position, the pressure is thrown entirely upon the frame of the machine, and I am enabled to dispense with tongues and neck-yokes.

The two bars 2 3 of the frame are supported respectively by the two wheels 27 28 through the medium of the spindles 29 29ª, by means of which I provide for the adjustment of these wheels in the following manner: Spindles 29 and 29ª are made with enlarged flat portions, 30 30ª, as clearly shown in Fig. 5. In the said flat portions I form two parallel elongated slots, 31 31. These slots serve for the attachment of the parts 29 29ª of the spindles to the parts 32 32ª. In each of the parts 32 32ª is also formed a curved slot, 33, and a bolt-hole, 34, said slot being struck in an arc having its center at the point 34. The adjacent faces of the parts 30 30ª and 32 32ª are corrugated or roughened, so as to hold them firmly together when their clamping-bolts are tightened. This arrangement is such as will permit of the adjustment, inward or outward upon the parts 32 32ª, of the spindles 29 29ª, when it is desired to set the inclined wheels inward or outward to lessen or increase the width of cut. This arrangement also allows of the adjusting of the angle of the wheels 27 28 according to the degree of inclination or the size of the mold-board. It will be seen that a greater pressure on the upper part of the mold-board, due to its more abrupt inclination or greater size, will necessitate the placing of the wheels 27 28 at a greater angle to receive the increased strain. By loosening the bolts 35 35 the spindles 29 29ª will pivot about the points 34, the upper slot, 31, and the slot 33 allowing sufficient amplitude of movement of the wheel to enable it, without removing either bolt, to be set at any angle of inclination, or even to a vertical position, when it is desired to convey the machine from place to place. No means of adjustment previously proposed have, to my knowledge, allowed such amplitude of adjustment without the removal of one or more of the parts of the joint.

The part 32 of the spindle 29 is formed with a semicircular portion, 36, which is held between the forked ends of the bar 3 by means of a pivot-bolt, 37, passing through holes in the ends of said forked bar through the hole 38 in plate 36.

A spring-catch, 39, extending forward on the bar 3 within control of the driver, has a downwardly-projecting end, 39ª, which passes through the upper fork of bar 3 and engages in a recess, 40, in plate 36 when the spindle 29 32 is in its normal position at right angles to the bar 3. When, however, it is desired to turn the machine the forward end of catch 39 is depressed by the foot of the driver, when the wheel 28, with its adjacent parts 36, 32, and 29, will swing freely upon the bolt 37 as a pivotal point until the shoulders 41 41 on the plate 36 limit the motion of the spindle by abutting against the sides of the bar 3.

In order that the fore wheel may not impede the turning of the machine, the driver may employ the lever 23, which, when pulled back, will throw the weight of the machine on the plow and the wheels 6 and 28, lifting the wheel 27 and allowing the machine to turn freely with the plow 19 as a pivot.

The following are some of the advantages of my improved sulky-plow: I am enabled to effectually dispense with that part known as the "bar" or "landside" of the plow without producing any side draft or causing the plow to draw in any other than a straightforward line parallel with the former furrow. I am also enabled to dispense with the tongue and neck-yoke, the three wheels thus arranged effectually guiding the plow. The width of furrow is regulated by the lateral adjustment of the forward (furrow) wheel. The beam-plate, having a vertical bearing against the vertical guide-bar, prevents the machine from running on the point of the plow. It also keeps the plow from tipping when raised out of the ground. There being no side draft to contend with, I am enabled to hitch the team from eight to ten inches closer to the plow. The form of joint of the rear wheel-spindle with the bar 3 permits ample horizontal movement of the rear wheel in turning the machine completely around, while the semicircular plate 36 provides sufficient bearing at any point of the wheel's movement to support the frame and prevent its sagging.

Having thus described my invention, the following is what I claim as new therein and desire to secure by Letters Patent:

1. In a sulky-plow, the transverse bar 1, having at one end the casting 4, with guide-piece 5, carrying the vertical wheel 6, and suitable mechanism for the vertical adjustment of the frame, and at its other end the casting 12, with its two webs 12ª 12ª, the frame 16, attached to the plow-beam 17, and provided with the two flanges 16ª 16ª, and suitable mechanism for raising and lowering the plow, the forward longitudinal bar, 2, supported by inclined wheel 27, and the rear longitudinal bar, 3, supported by the inclined wheel 28, in combination with the transverse piece 13, uniting the castings 4 and 12, the rear oblique brace-bar, 14, connected at its front end to the transverse piece 13 and at its rear end to the bar 3, and the front oblique brace-bar, 14ª, connected at its rear end to the transverse piece 13 and at its front end to the bar 2, substantially as and for the purpose set forth.

2. In a sulky-plow, the transverse bar 1, having at one end the casting 4, with accessories for carrying the wheel 6 and for the vertical adjustment of the frame, and at the other end the casting 12, provided with two flanges, 12ª 12ª, the frame 16, provided with two webs, 16ª 16ª, and attached to the plow-beam 17, in combination with longitudinal bars 2 3, transverse bar 13, oblique brace-bars 14 14ª, and bar 42, swiveled at its rear end to the casting 4 and attached at its forward end to the plow-beam 17, substantially as and for the purposes specified.

3. In a sulky-plow, the bar 3 and foot-bar 39, with downturned end 39ª, in combination with casting 32, formed with semicircular portion 36, having the shoulder 41 and perforations 38 40 and slots 33 34, the spindle 29, provided with slots 31 31, and bolts 35 35, substantially as and for the purpose herein set forth.

THOMAS L. RICHARDSON.

Witnesses:
OCTAVIUS KNIGHT,
HARRY E. KNIGHT.